Aug. 29, 1939.    J. R. THORP ET AL    2,170,980
VEHICLE COUPLING
Filed Feb. 23, 1937
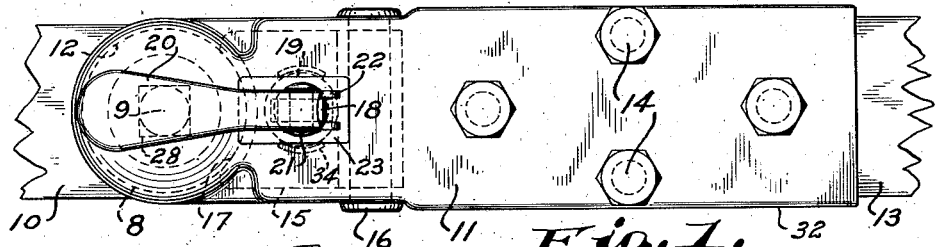
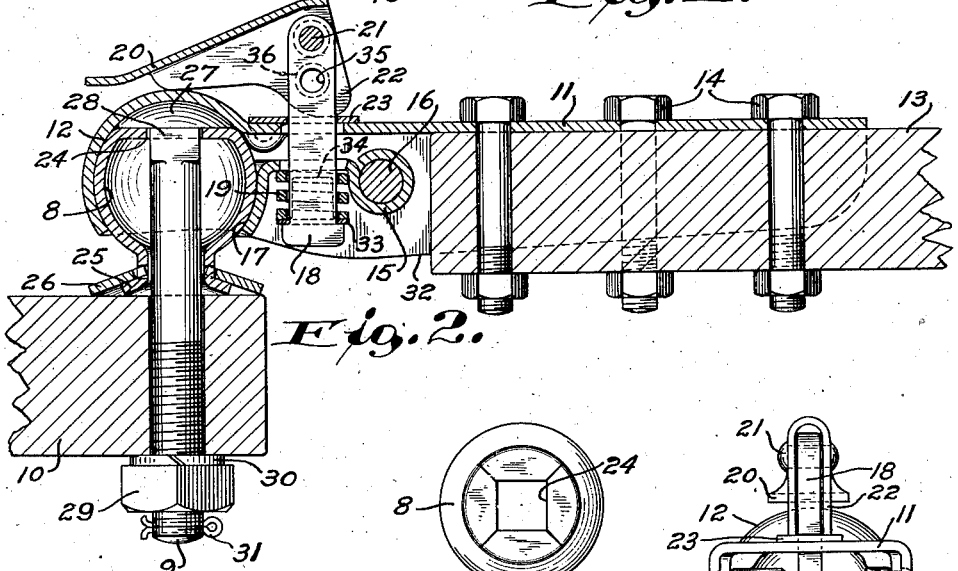
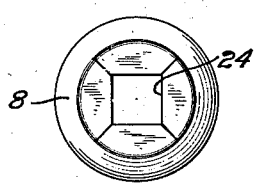
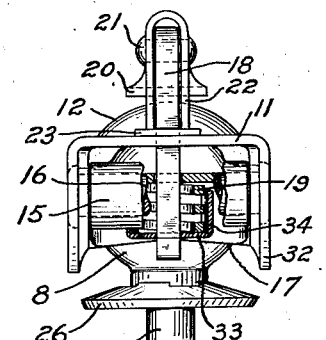
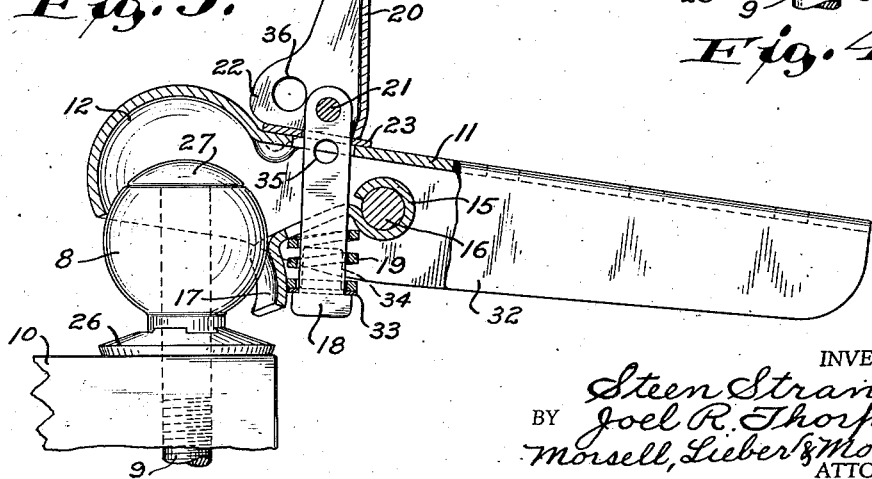
INVENTORS
Steen Strand
BY Joel R. Thorp
Morsell, Lieber & Morsell
ATTORNEYS.

Patented Aug. 29, 1939

2,170,980

UNITED STATES PATENT OFFICE 2,170,980

VEHICLE COUPLING

Joel R. Thorp and Steen Strand, West Allis, Wis., assignors to The Fulton Company, West Allis, Wis., a corporation of Wisconsin Application February 23, 1937, Serial No. 127,094

8 Claims. (Cl. 280—33.15)

Our present invention relates in general to improvements in the construction of devices for interconnecting vehicles, and relates more specifically to an improved coupling for detachably attaching a trailer to a draft vehicle such as an automobile.

Generally defined, an object of our present invention is to provide an improved vehicle coupling which is simple and durable in construction, and which is also highly efficient in operation.

Many different types of so-called trailer couplings for attaching a trailer to a draft vehicle, have heretofore been proposed and marketed, but most of these prior coupling devices are objectionable for divers reasons. The rapidly growing popularity of the so-called house trailers which are adapted to be drawn by ordinary pleasure cars or automobiles, has made it desirable to provide a conveniently attachable and releasable coupling which is safe and durable in construction, yet compact and neat in appearance. Those prior trailer hitches which were sufficiently readily detachable, were also liable to become detached during normal use; and others of the prior trailer couplings which were relatively safe, were so complicated and cumbersome that the trade would not readily accept them for these reasons. Then too, many of the prior coupling devices were too costly for most of the prospective users; and the cheaper prior couplings were not sufficiently durable to withstand the constant shock, wear, and other abuses to which these devices are ordinarily subjected. The prior trailer couplings are therefore relatively objectionable for numerous reasons, and none of them embody all of the desirable features hereinabove referred to.

It is therefore a more specific object of our present invention to provide an improved coupling device which may be readily attached and manipulated, which is durable and safe, and which may be manufactured and sold at moderate cost.

Another specific object of our invention is the provision of a new and useful coupling assemblage, the more important elements of which may be constructed from suitable sheet metal with the aid of punches and dies, and which therefore presents a neat and highly finished appearance.

A further object of our invention is to provide a relatively light but strong trailer hitch, which may be conveniently connected or disconnected, and which is also adapted to be positively locked in inter-connected condition.

These and other objects and advantages of the invention will be apparent from the following detailed description.

A clear conception of a practical embodiment of the various features constituting the present improvement, and of the mode of constructing and of using vehicle couplings built in accordance with our invention, may be had by referring to the drawing accompanying and forming a part of this specification wherein like reference characters designate the same or similar parts in the several views.

Fig. 1 is a top view of one of our improved vehicle couplings;

Fig. 2 is a central longitudinal vertical section through the coupling of Fig. 1, showing the same assembled and connected as when in normal use.

Fig. 3 is another central longitudinal vertical section through the coupling assemblage, showing the parts in the act of being disconnected;

Fig. 4 is a part sectional rear view of the coupling assemblage; and

Fig. 5 is a top view of the sheet metal ball member with the connecting bolt removed therefrom.

While we have shown and described our invention herein as being specifically embodied in a trailer coupling especially adapted for association with an automobile, it is not the intent to thereby unnecessarily restrict the scope since some of the novel features may be more generally applicable.

Referring to the drawing, the improved vehicle coupling shown therein, comprises in general, a ball member 8 pierced by a bolt 9 for firmly attaching the ball member 8 to a portion 10 of the draft vehicle; a socket member 11 having a substantially semi-spherical downwardly-open socket 12 at its forward end cooperable with the ball member 8, and being firmly attachable to the draft tongue 13 of a trailer by means of bolts 14; a retaining element 15 pivotally suspended from the socket member 11 by means of a transverse pin 16 and having a front spherical zone surface 17 cooperable with the rear lower portion of the spherical surface of the ball member 8 to normally hold the latter within the socket 12; a vertically movable releasing bar 18 projecting upwardly through the retainer element 15 and through the socket member 11; a compression spring 19 encircling the bar 18 and coacting with the retainer element 15 and with a lower enlarged end of the bar 18; and a manipulating lever 20 swingably attached to the upper extremity of the bar 18 by a pin 21 and having spaced cam portions 22 cooperable with a reaction plate 23 to normally compress the spring 19 and to hold the retainer element 15 in retaining position.

While the ball member 8 may be formed by casting if so desired, it has been shown herein as being formed entirely of sheet metal, and this member comprises an upper substantially spherical and circumferentially continuous portion, the top of which is folded inwardly as shown in Fig. 5 to provide a square hole 24, and the lower end of which is provided with an annular series of depending projections 25; and a relatively flat frustro-conical sheet metal base 26 having notches therein for receiving the ball projections 25 and at which these projections are bent outwardly so as to rigidly interconnect the parts. The base 26 may be additionally secured to the upper ball portion by welding, and the ball member 8 is obviously hollow so as to permit free insertion and removal of the attaching bolt 9. The bolt 9 has a head 27, the upper surface of which is a spherical zone surface, and this bolt has a square portion 28 directly adjacent to the head 27 adapted to coact with the hole 24 in the ball member 8 so as to prevent turning of the bolt relative to this member. The shank of the bolt 9 may be threaded for coaction with a clamping nut 29 which in turn coacts with the vehicle portion 10 through a lock washer 30, and is prevented from falling off of the bolt 9 by a cotter pin 31.

The socket member 11 is preferably formed of a single sheet of metal with the aid of punches and dies, and the pivot pin 16 is riveted or otherwise rigidly attached to the depending side flanges 32 of the member 11, which form a recess for the end of tongue 13 and also materially stiffen and strengthen the socket member. The retaining element 15 which is pivotally suspended from the pin 16, is also formed of relatively heavy sheet metal with the aid of dies, and is swingable between the side flanges 32 of the member 11 by the lever 20 and spring 19 coacting with the bar 18. The flat bar 18 may likewise be stamped from thick sheet metal, and this bar has slidable coaction with slots in the member 11 and in the swingable retaining element 15, these slots being of sufficient length to permit the bar to tilt as shown in Fig. 3 when the lever 20 is in released position. The helical compression spring 19 coacts directly with the under-side of the retainer element 15, and reacts against the lower enlargement of the bar 18 through a sheet metal plate 33 snugly embracing the releasing bar and having spaced guard flanges 34 at the opposite sides thereof for properly confining the spring 19 in position in case the spring should break.

The manipulating lever which is pivotally attached to the upper end of the bar 18, is again formed of sheet metal, and the cam portions 22 are formed integral with this lever. These cam portions 22 are normally forced into engagement with the reaction plate 23 by the spring 19; and the plate 23 which is also formed of sheet metal, snugly embraces the bar 18 while permitting free sliding of the latter through the plate. The cam portions 22 are so formed that when the lever 20 is in locking position, the spring 19 will be compressed and will tend to constantly swing the manipulating end of the lever 20 downwardly toward the socket 12 as shown in Fig. 1. The bar 18 has a transverse hole 35 therethrough which is registrable with slightly larger alined holes 36 in the cam portions 22 when the lever 20 is in locking position, so that a padlock may be applied to the holes 35, 36 in order to positively lock the lever in such position.

When the improved coupling assemblage has been properly constructed, assembled, and applied to the portion 10 and tongue 13 of cooperating vehicles, the ball member 8 may be inserted within or removed from the socket 12 at the will of the user. After the coupling has been assembled as shown in Fig. 2, draft applied to either of the portions 10, 13 will obviously be transmitted to the other through the ball and socket joint afforded by the member 8 and the socket 12 of the member 11, and this ball and socket joint will obviously permit limited universal motion of one of the members relative to the other. The cam portions 22 of the lever 20 cooperating with the spring 19, will effectively retain the coupling in assembled position, and the surface 17 of the retainer element 15 will obviously be resiliently urged into engagement with the rear portion of the ball member 8. By applying a padlock to the openings 35, 36, the elements will be effectively locked in connected condition and separation of the coupling will only be possible upon removal of the padlock.

If it becomes desirable to detach the coupling, it is only necessary to remove the padlock from the alined openings 35, 36 and to thereafter swing the lever 20 into the position shown in Fig. 3. The bar 18 will then be lowered sufficiently to permit the retainer element 15 to swing away from the socket 12 so as to enable the ball member 8 to be freely withdrawn from the socket 12. Upon removal of the ball member 8, this member may be permitted to remain upon the draft vehicle until reassembly of the coupling is desired. Such reassembly of the coupling structure may obviously be effected just as easily as the disconnecting thereof, and the parts may again be locked in assembled condition by merely swinging the lever 20 forwardly over the socket 12, and by thereafter applying the padlock if desired.

From the foregoing description it will be apparent that the present invention provides an extremely simple and compact vehicle coupling assemblage which may be quickly connected or disconnected at the will of the operator, and which when once connected, will remain in that condition. All of the major elements of the coupling may be formed of sheet metal with the aid of punches and dies, and therefore produces a neat appearing assemblage having great strength, and which may be manufactured and sold at minimum cost. By constructing the various parts of sheet metal, these parts are also made readily interchangeable with other similar parts, and proper fitting of repair parts is thereby assured. The spring 19 besides serving to assist in retaining the assemblage in connected condition, also provides a resilient retaining pressure upon the ball member 8 when the latter is within the socket 12, thereby permitting free articulation of the coupling member while eliminating rattling. In case the spring 19 should break, the ears or flanges 34 of the plate 33 will prevent the pieces of spring from dropping out of place, so that even then the ball member 8 cannot be withdrawn from the socket 12 unless the lever 20 is released. These side flanges 34 of the plate 33 also normally limit the extent to which the spring 19 may be compressed, as clearly indicated in Fig. 4. The socket 12 of the member 11 has its lower wall portion extended inwardly a considerable distance beneath the ball, so that vertical withdrawal of the ball from the socket cannot be effected even after the lever 20 has been released, without first tilting the socket member 11 to a position such as shown in Fig. 3.

This improved construction of the socket 12 therefore relieves the bar 18 and lever 20 from excessive pressures in retaining the element 15 in normal position, and in order to hold the ball in normal position. The entire coupling unit is moreover compact and durable in construction and is especially adapted for use in conjunction with trailers which are adapted to be hauled by automobiles.

It should be understood that it is not desired to limit this invention to the exact details of construction or to the precise mode of use herein shown and described, for various modifications within the scope of the claims may occur to persons skilled in the art.

We claim:

1. In a vehicle coupling, a ball member, a socket member having a socket articulably cooperable with the front and side portions of said ball member and also having an integral shank extending horizontally away from said socket, a retaining element permanently pivotally suspended from said socket member within said shank and having a surface cooperable only with the rear of said ball member to normally maintain the latter within said socket, an actuating bar having a lower headed end beneath said element and projecting upwardly above said shank, a plate coacting with said headed bar end and having an abutment for limiting the swinging motion of said element, a compression spring interposed between said plate and said element, and a cam lever coacting with said bar and with said socket member to compress said spring.

2. In a vehicle coupling, a ball member, a socket member having a socket cooperable with said ball member and also having a shank extending rearwardly away from said socket, a retaining element permanently pivotally suspended from said socket member and having a retaining surface cooperable only with the rear lower portion of said ball member to maintain the latter within said socket, an actuating bar penetrating said shank and said retaining element and having a lower headed end disposed beneath said element, a plate coacting with said headed bar end and having abutments for limiting the swinging movement of said element, a spring interposed between said plate and said element, and means coacting with said bar and with said shank for compressing said spring.

3. In a vehicle coupling, a ball member, a socket member coacting with said ball member and having a rearwardly extending shank, a retaining element pivotally suspended from said shank and being cooperable with the rear of said ball member to maintain the same within said socket member, an actuating bar penetrating said shank and said element, a plate secured to the lower portion of said bar and having an abutment for limiting the swinging motion of said element, a spring interposed between said plate and said element, and means coacting with the upper portion of said bar for compressing said spring.

4. In a vehicle coupling, a ball member, a socket member coacting with said ball member and having a rearwardly extending shank, a retaining element pivotally suspended from said shank and being cooperable with the rear of said ball member to maintain the same within said socket member, an actuating bar penetrating said shank and said element, a plate associated with the lower end of said bar and having laterally spaced abutments for limiting the swinging movement of said element, a spring coacting with said plate and with said element between said abutments, and means coacting with the upper end of said bar for compressing and releasing said spring.

5. In a vehicle coupling, a ball member, a socket member having a socket cooperable with said ball member and also having a shank extending away from said socket, a retaining element permanently pivotally suspended from said socket member and having a retaining surface cooperable with said ball member to maintain the latter within said socket, an actuating bar penetrating said shank and said retaining element and having a lower headed end disposed beneath said element, a plate coacting with said headed bar end and having abutments extending upwardly therefrom, a spring interposed between said plate and said element between said abutments, a cam lever coacting with said bar and with said shank for compressing said spring, and means for effecting locking of said lever to said bar.

6. In a vehicle coupling, a ball member, a socket member coacting with said ball member and having an integral shank, a retaining element pivotally suspended from said shank and being cooperable with said ball member to maintain the same within said socket member, an actuating bar penetrating said shank and said element, a plate secured to the lower portion of said bar and having an upwardly extending abutment, a spring interposed between said plate and said element adjacent to said abutment, a cam lever coacting with the upper portion of said bar for compressing said spring, and means for effecting locking of said lever directly to said bar.

7. In a vehicle coupling, a ball member, a socket member coacting with said ball member and having an integral shank, a retaining element pivotally suspended from said shank and being cooperable with said ball member to maintain the same within said socket member, an actuating bar upwardly penetrating said shank and said element, a plate associated with the lower end of said bar and having laterally spaced abutments for limiting the swinging movement of said element, a spring coacting with said plate and with said element between said abutments, a cam lever coacting with the upper end of said bar for compressing and releasing said spring, and means for effecting locking of said lever directly to said bar.

8. In a vehicle coupling, a ball member, a socket member coacting with said ball member and having a shank, a retaining element pivotally suspended from said shank and being cooperable with said ball member to maintain the same within said socket member, an actuating bar extending upwardly through said shank and said element, a plate associated with said bar and having abutments, a spring coacting with said plate and with said element between said abutments, a cam lever pivotally attached to the upper end of said bar and being cooperable with said shank to compress said spring, and means for effecting locking of said lever directly to said bar.

JOEL R. THORP.
STEEN STRAND.